United States Patent [19]

Pagani

[11] 4,015,622
[45] Apr. 5, 1977

[54] VALVE FOR USE WITH INFLATABLE ARTICLES SUCH AS PNEUMATIC BOATS

[75] Inventor: Ezio Pagani, Bergamo, Italy

[73] Assignee: National Distillers and Chemical Corporation, New York, N.Y.

[22] Filed: Nov. 19, 1975

[21] Appl. No.: 633,353

[30] Foreign Application Priority Data

Nov. 22, 1974 Italy ............................... 29726/74
May 30, 1975 Italy ............................... 23875/75

[52] U.S. Cl. ........................... 137/223; 137/523; 251/291
[51] Int. Cl.² ....................................... F16K 15/20
[58] Field of Search .......... 137/223, 230, 224, 232, 137/233, 522, 523; 251/291

[56] References Cited

UNITED STATES PATENTS

| 2,652,067 | 9/1953 | Hosking | 137/223 |
| 2,789,577 | 4/1957 | Hosking | 137/223 |
| 2,804,085 | 8/1957 | Geambeardino | 137/223 |
| 2,824,570 | 2/1958 | Silverman | 137/223 |
| 3,785,395 | 1/1974 | Andreasson | 137/223 |

Primary Examiner—Harold W. Weakley
Attorney, Agent, or Firm—Kenneth D. Tremain

[57] ABSTRACT

Valve for inflating and deflating inflatable articles, completely coated with rubber or other similar material, so that it can be vulcanized or otherwise sealed to the inflatable article. Systems are also provided for allowing fast deflation of the inflatable article, either by reason of applying and securing a tongue provided at the end of the valve plug; or by pressing and rotating the valve closure member such that projections or tabs provided on said closure member engage with the valve body whereby the valve remains open until the tabs are returned to recesses provided in the valve body.

5 Claims, 8 Drawing Figures

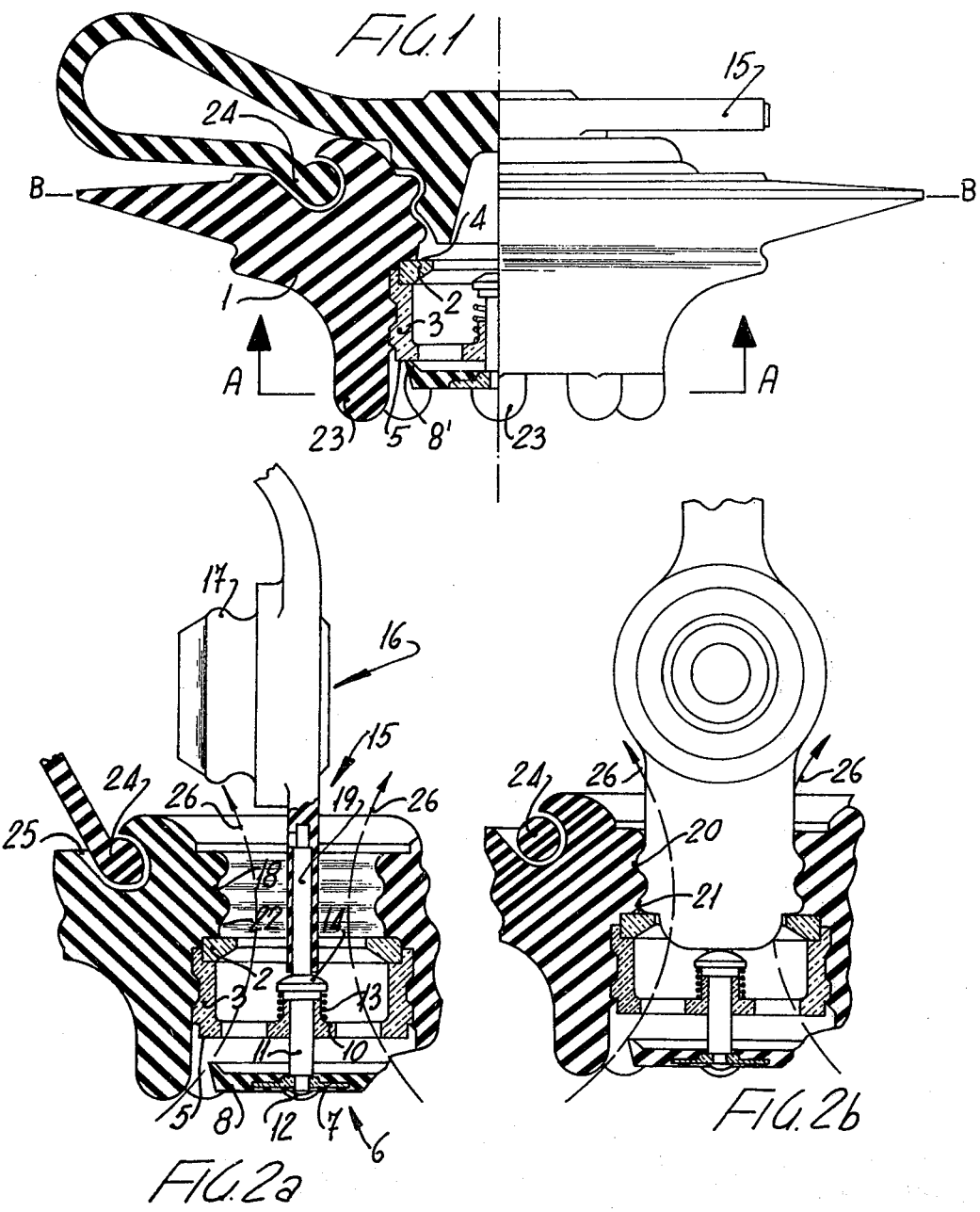

VALVE FOR USE WITH INFLATABLE ARTICLES SUCH AS PNEUMATIC BOATS

BACKGROUND, OBJECTS AND SUMMARY OF THE INVENTION

The present invention relates to inflating and deflating valves and, in particular, to those used in connection with inflatable articles.

For inflation and deflation purposes, all inflatable articles, and particularly rubber boats, are provided with a valve that is normally assembled on a perforated wall of the rubber article by compressing a seal or gasket between the valve wall and an underlying washer, and this in order to provide for valve sealing on the rubber article.

These valves have the disadvantage of frequent leakages from said compressible seal or gasket. Furthermore, valves hitherto known form a hard member which is inserted in a delicate flexible inflatable article, thus establishing a location for possible failure all about the valve.

In order to avoid these disadvantages and provide the advantages to be set forth hereinbelow, a new type of valve has been designed, the valve being coated with rubber of the like so that it can be directly vulcanized on the inflatable article. According to a first embodiment of the invention, the valve can also be provided with a plug, one end of which is so provided that it can act as a deflation member by inserting and fastening within the valve body.

According to a further embodiment of the invention, the closure member of the valve is provided with two tabs or projections spaced apart from each other and perpendicularly orientated with respect to the plane of the closure member. When the valve is at its closed position these projections penetrate into the inner valve body without interfering at all with the valve operation. On the other hand, when said closure member is depressed and rotated along with said projections, the latter will bear on the brace or spokes supporting and guiding the closure member pin, whereby the valve remains in an open position.

The valve will be closed again when the closure member with its projections are rotated again so as to penetrate into an inner portion of the valve.

According to a further improvement of the invention, to thoroughly avoid that when exposed to maximum or highest pressure a valve may undergo a slight ovalization as a result of traction forces developed within the inflated article, so that a rather faulty sealing of the external plug might possibly occur, it is contemplated that the metal valve body should be nearly completely incorporated within the valve, said body acting as a reinforcement for said rubber portion of the valve. Thus, the cylindrical metal valve body will extend substantially the full length of the valve structure, the body being completely incorporated within the rubber or the like, thereby increasing both the contacting surface between the rubber or the like and the metal — so as to produce greater adherence to said metal valve body — and resistance against possible ovalization.

It should now be noted that the embodiments herein disclosed can be coated with rubber or any other material which can be cured or vulcanized or otherwise sealed to the flexible material forming the inflatable article. Just for the sake of brevity, only rubber and vulcanization will be hereinafter mentioned in connection with the sealing process being used.

The primary advantages attained by the valve of the present invention are as follows:

a. The particular type of rubber used for this valve has all of the inherent advantages of this material, that is, it has good tensile strength; moreover, it possesses great resistance to tearing, abrasion and permanent deformation, and to extremes of weather; it also has particularly good sea water resistance.

b. Rubber, or the like, forming the external coating enables vulcanization or sealing to the inflatable article, thereby providing a very good sealing at the junction between valve and article.

c. The softness of the coating used and rounded shape provided for the valve do not impair at all the inflatable article, creating a harder and stiffer location than all the remaining part of the article, thus avoiding damages to the neighboring parts of the valve when the article is disassembled, collapsed or stored.

d. The valve made of soft material and having a reduced projection outwardly of the inflatable article, particularly boat, substantially minimizes any possibility of abrasion or bruise to the article users.

e. The possibility of totally and also partly deflating the inflatable article in an extremely simple manner by the proper plug tongue or by a simple finger pressure and subsequent rotation. Furthermore, in case of prolonged sun exposure, to reduce the inner pressure it will be sufficient to exert a slight finger pressure on the inner plunger.

f. Simplicity of construction.

Other and further objects, advantages and features of the present invention will be understood by reference to the following specification in conjunction with the annexed drawing, wherein like parts have been given like numbers.

BRIEF DESCRIPTION OF THE DRAWING

FIG. 1 is a partly sectional view, in the closed position, of a valve according to a first embodiment of the present invention;

FIGS. 2a and 2b are two sectional views of the valve shown in FIG. 1, the views being taken at right angles to each other, the tongue providing the deflation means being mounted on the valve seat; that is, in the open position;

DESCRIPTION OF PREFERRED EMBODIMENT

Figure 3:
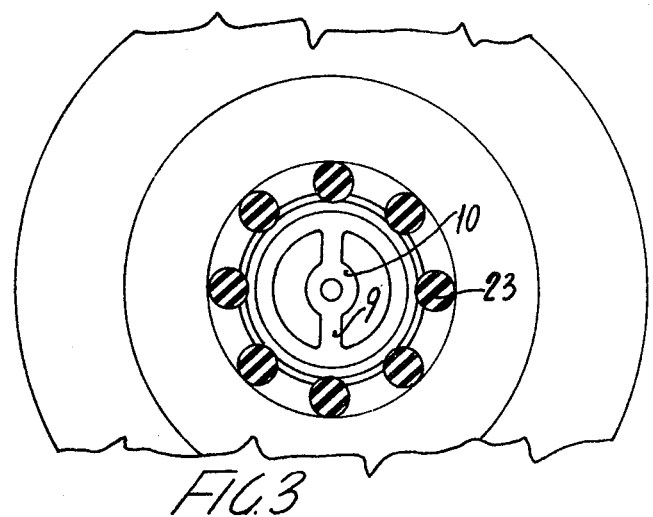
FIG. 3 is a view taken along line A—A of FIG. 1.
Figure 4:
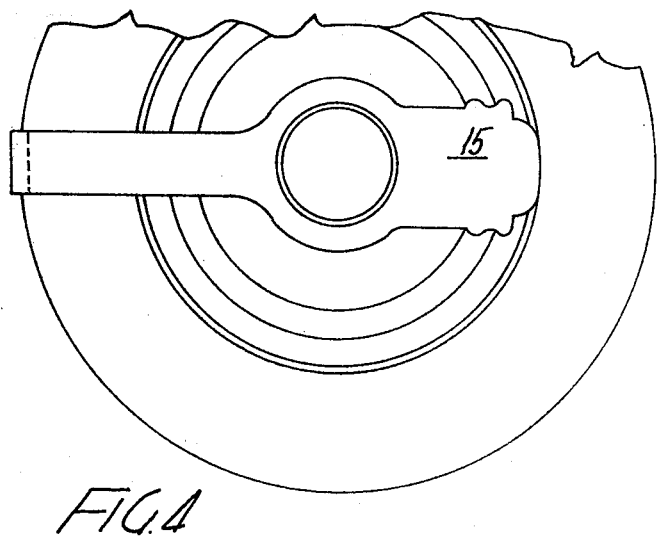
FIG. 4 is a top view of the valve according to FIG. 1.

Referring first to FIG. 1, a valve according to the present invention comprises a portion 1 of rubber material or the like, having embedded therein two metal portions forming respectively, a ring 2 and a valve body 3. The upper surface 4 of ring 2 is provided for receiving an inflation member, whereas the underside 5 of valve body 3 accomplishes the function of a seat for a closure member and is suitable to receive said member, which is generally designated by reference numeral 6.

This closure member 6 comprises a metal cap 7 (see FIGS. 2a and 2b) also coated with rubber or the like 8 having a projecting annular rim 8' bearing on said valve seat 5. Valve body 3 has spokes 9 (see FIG. 3) supporting a perforated hub 10, within which pin 11 is guided, said pin 11 being secured to cap 7 by means of riveting.

Closure member 6 remains generally pressed against the seat because of the provision of a spring 13 resting on the top of hub 10 and on a head 14 made fast with pin 11. Two sectional views of the valve interior are seen in FIGS. 2a and 2b, which show the valve in the open position so as to allow the release of air as a consequence of the valve head 14 being pressed by a tongue, which is generally designated by reference numeral 15. This tongue 15 is carried by a plug 16 which normally accomplishes the function of closure of the top of the valve. Said plug 16 is connected to a ring 24 which is forcibly inserted in a corresponding annular recess 25. The lower portion of the plug at the inner zone penetrating into the valve is provided with a protuberance or boss 17 penetrating into a corresponding depression 18 provided internally of the valve in the rubber or like portion, as clearly shown in the sectional view of FIG. 1. Tongue 15 of the valve plug comprises a metal portion 19 which is coated with rubber, just as all of the valve remainder. Generally, tongue 15 is of flat shape and has two side enlargements 20 and 21 (see FIG. 2b) fitting in corresponding depressions 18 and 22 provided internally of the valve at the non-metal zone. Thus, the tongue will remain attached to the valve body when desiring to deflate the inflatable article. In this case, the air will exit following the path shown by arrows 26.

As shown in the drawings, vulcanization or sealing to the article of rubber or other flexible material may incorporate the valve according to the present embodiment of the invention, so that the valve will project only to a very small extent, that is, substantially only the plug, while all of what lies beneath line B—B of FIG. 1 remains within the article.

At the valve bottom, projections 23 have been provided for opening the valve even when the latter is bearing against a surface, while being effective in that the metal body of the valve does not cause any damage to the inflatable article because no flexible parts of the article can rub against metal ones.

Figure 5:
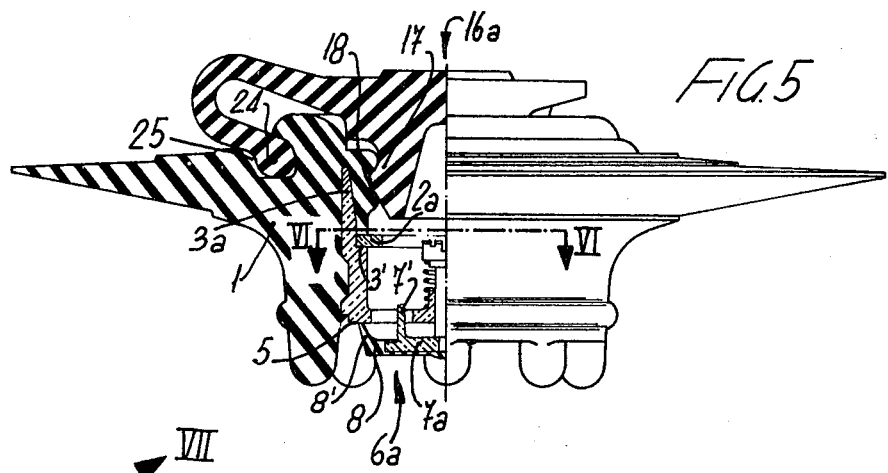
FIG. 5 is a partly sectional view of a second embodiment according to the present invention shown at its closed position.

Passing now to the embodiment shown in FIG. 5, which is in the closed position, it will be seen that the rubber coating 1 is penetrated through nearly all of its length by tubular body 3a substantially formed by a hollow cylinder. Throughout its external surface and on about half of its internal surface, said body 3a is encircled or surrounded by rubber, thereby developing a good adhesion with rubber and preventing the latter from being distorted under stress, causing the valve to take a shape which is always perfectly identical to that of said metal body 3a. Therefore, the arrangement afforded by valve body 3a is in some cases to be preferred to the arrangement of body 3 shown in FIGS. 1 to 4.

Figure 6:
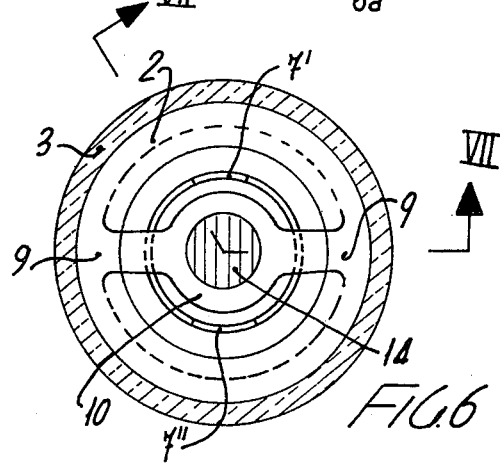
FIG. 6 is a sectional view taken along line VI—VI of FIG. 1, wherein the rubber or like parts have been omitted.
Figure 7:
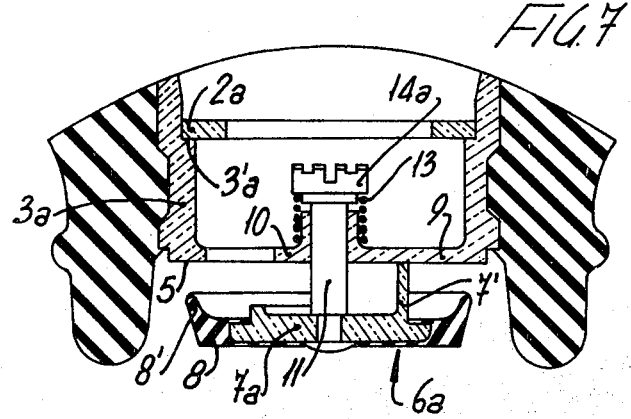
FIG. 7 is a sectional view taken along line VII—VII of FIG. 6, but with the valve shown at its open position.

The valve according to the embodiment of FIGS. 5 to 7 further comprises a plug 16a which remains connected to the valve by a ring 24 penetrating into an annular recess 25. The plug 16a is substantially identical to plug 16 described in connection with FIGS. 1 to 4; that is, it has a protuberance or boss 17 penetrating into a depression 18 of corresponding shape provided within rubber coating 1. The only difference is that plug 16a has no extension tongue for deflating the inflated article.

Metal body 3a has an abutment 3', having bearing thereon a ring 2a acting as a stop member for the inflation means that is caused to penetrate from the top in lieu of plug 16a, which of course is removed upon inflation.

Closure member 6a comprises a rubber coating 8 having such a shape that a circular projection 8' thereof presses against seat 5, the latter comprising the base of hollow cylindrical body 3a. A metal cap 7a is incorporated in said rubber coating and has two tabs 7' and 7'' directed perpendicularly to the closure member and towards the perforated inner hub 10 serving as a guide for pin 11, which is secured by riveting to cap 7a. Therefore, said closure member 6a is capable of moving at right angles to its plane and is urged to its closed position, that is, in upward direction as seen in the drawings, by a spring 13 bearing on one side on an abutment on hub 10 and on the other side on a knurled head 14a provided at the other end of pin 11. Hub 10 is supported by braces or spokes 9 branching from the periphery of cylindrical hollow body 3a and are centrally directed to merge with hub 10 (FIGS. 6 and 7).

Knurled head 14a can be rotated by a finger after exerting the required pressure to compress spring 13 to lower said closure member 6a and release tabs 7' and 7'', clearing the latter from spokes 9.

The operation of the valve according to the embodiment of FIGS. 5 to 7 is as follows. The valve at closed position has been shown in FIGS. 5 and 6, in which tabs 7' and 7'' perpendicular to the plane of closure member 6a penetrate into the space between the hub 10, body 3a of the valve, and spokes 9. When pressing by a finger on knurled head 14a and causing the latter to rotate by about 90°, said tabs 7' and 7'' will rest on spokes 9, whereby closure member 6a and particularly rubber portion 8' will move away from seat 5 of the valve body 3a. Thus, the valve will take the position shown in FIG. 7, in which passage is allowed for air and thereby deflation of the inflated article. To allow for reinflating the inflatable article through the valve, it will be sufficient to rotate again said knurled head 14a such that said tabs 7' and 7'' move back to the position thereof shown in FIGS. 5 and 6, that is, penetrate into the semicircular holes between said valve body 3a, central hub 10, and spokes 9.

As it will be appreciated from the drawings and the foregoing description, the described embodiments are of a very simple construction, economical and such that all of the above-mentioned advantages are attained.

While there have been shown and described what are considered at present to be the preferred embodiments of the present invention, it will be appreciated by those skilled in the art that modifications of such embodiments may be made. It is therefore desired that the invention not be limited to these embodiments, and it is intended to cover in the appended claims all such modifications as fall within the true spirit and scope of the invention.

What I claim is:

1. A valve for use with an inflatable article, said valve comprising
    a hollow cylindrical valve body;
    a closure member adapted to seat against the bottom wall of said valve body, said closure member including a cap and a pin, having a head, secured to said cap;

a hub formed as part of the bottom wall of said valve body, and a spring disposed between said hub and said head such that said closure member is urged against said bottom wall;

a pair of upstanding tabs on said closure member normally extending through openings provided in the bottom wall of said valve body such that said valve is in its closed position;

said valve including means for deflating said article such that when said pin is pressed inwardly and rotated, the tabs on said closure member will be moved sufficiently such that they will then abut against a solid portion of said bottom wall so as to keep said valve in the open position.

2. Apparatus as defined in claim 1, in which said solid portin is defined by spokes branching from the periphery of the hollow cylindrical body to said hub formed at the center thereof.

3. Apparatus as defined in claim 1, in which the cap of the closure member for closing and opening the valve is coated with rubber.

4. Apparatus as defined in claim 1, in which said valve has projections at the bottom thereof so as to afford free movement of said closure member even when said valve is bearing against the surface of said article, thereby avoiding damage to said inflatable article.

5. Apparatus as defined in claim 1, in which cylindrical valve body is surrounded with rubber at its inner surface to the extent of approximately one-half of that surface.

* * * * *